Feb. 8, 1944.   A. J. TROTT   2,340,999
MOTOR OPERATED VALVE
Filed June 4, 1942   3 Sheets-Sheet 1

INVENTOR.
ARTHUR J. TROTT.
BY *Albert J. Henderson*
ATTORNEY.

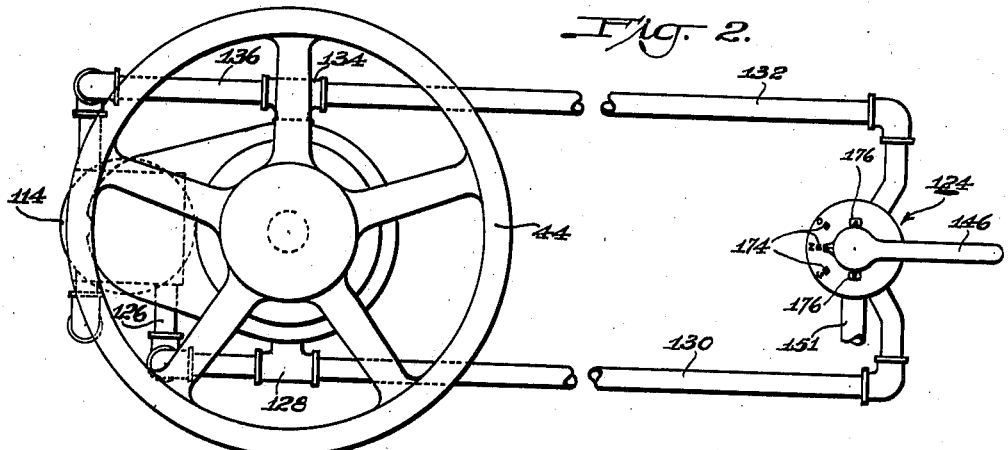
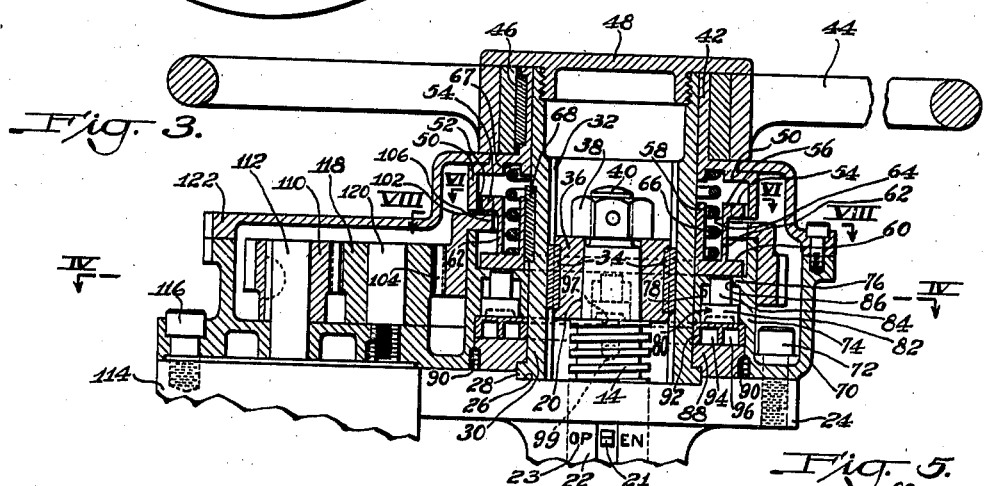
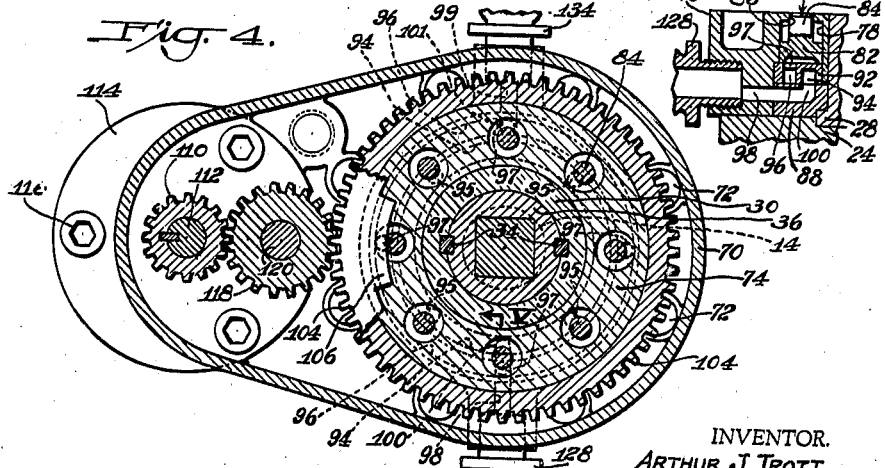
INVENTOR.
ARTHUR J. TROTT.
BY
Albert J. Henderson
ATTORNEY.

Feb. 8, 1944.　　　　A. J. TROTT　　　2,340,999
MOTOR OPERATED VALVE
Filed June 4, 1942　　　3 Sheets-Sheet 3
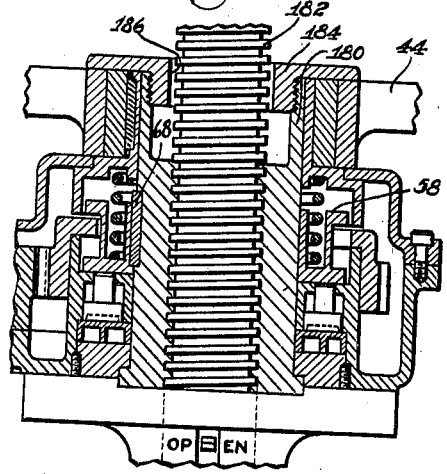
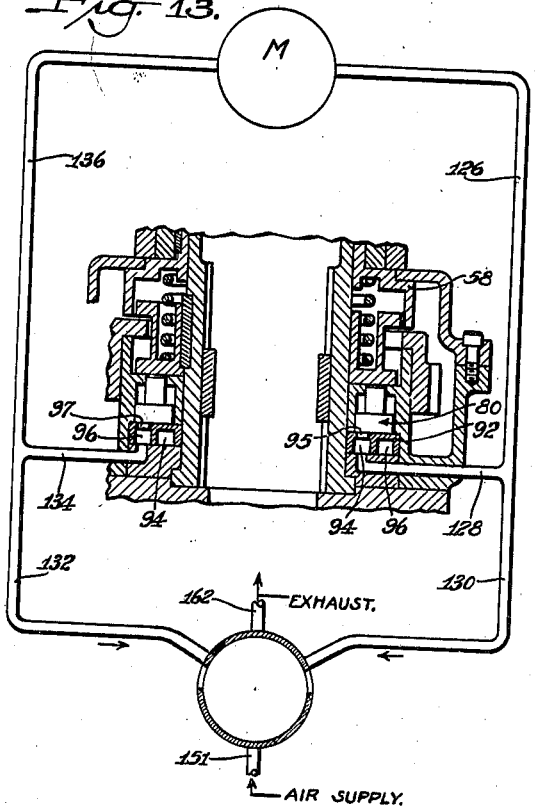
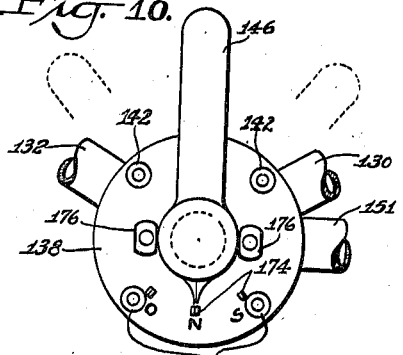
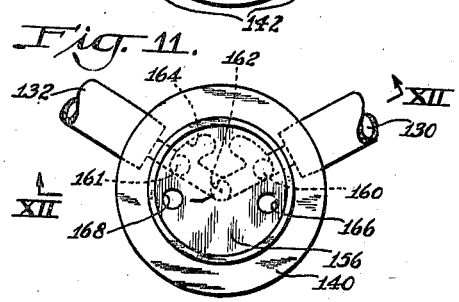
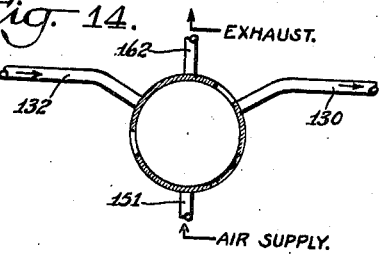
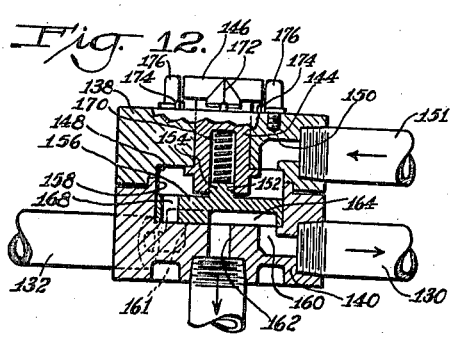
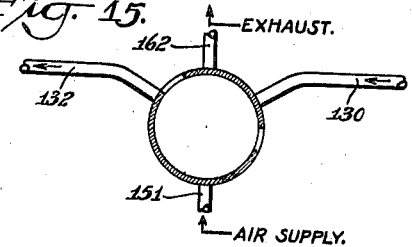
INVENTOR.
ARTHUR J. TROTT.
BY
ATTORNEY.

Patented Feb. 8, 1944

2,340,999

UNITED STATES PATENT OFFICE 2,340,999

MOTOR OPERATED VALVE

Arthur J. Trott, Greensburg, Pa., assignor to Walworth Patents Inc., Boston, Mass., a corporation of Massachusetts Application June 4, 1942, Serial No. 445,744

15 Claims. (Cl. 137—139)

This invention relates to power operated valves and more particularly to power operated valves having provision for manual actuation.

One object of the invention is to convert manually operated valves for combined power and manual actuation without excessive alterations.

Another object of the invention is to permit combined power and manual actuation of either rising or non-rising stem valves.

Another object of the invention is to operate the valves by power between open and closed positions from any distance with a minimum of connecting parts.

Another object of the invention is to permit power actuation from a remote point and manual actuation at the valve location without danger to the operator.

Another object of the invention is to secure a compact arrangement so that conversion of the valves to combined power and manual actuation will not result in excessive overall height or otherwise detract from the appearance or field of use.

Other objects and advantages will become apparent from the following description taken in connection with the accompanying drawings wherein:

Fig. 2 is a plan view of the same,

Fig. 3 is a partial sectional view of the valve operating mechanism,

Fig. 4 is a section taken on the line IV—IV of Fig. 3,

Fig. 5 is a section taken on the line V—V of Fig. 4,

Figure 7:
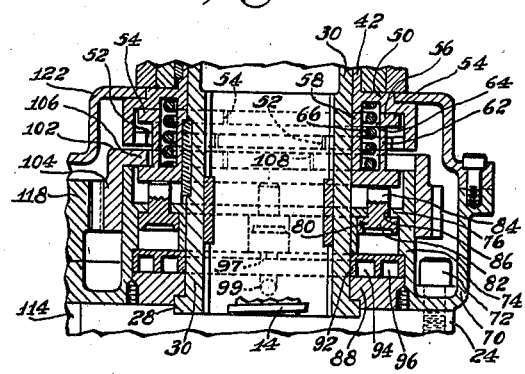
Figure 8:
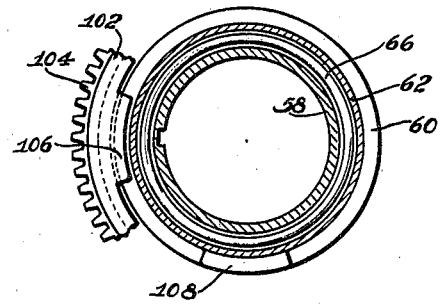

Fig. 7 is a partial section similar to Fig. 3, but showing the parts in another position, Fig. 8 is a section taken on the line VIII—VIII of Fig. 3, Fig. 9 is a partial section similar to Fig. 3, but showing a modified form, Fig. 10 is a plan view of the distributing valve, Fig. 11 is a plan view similar to Fig. 10 but with the parts removed to show the interior structure, Fig. 12 is a section taken on the line XII—XII of Fig. 11, Fig. 13 is a schematic view illustrating the course of fluid from the distributing valve to the valve operating mechanism and motor, and Figs. 14 and 15 are schematic views of the distributing valve in a different position from that of Fig. 13.

Referring more particularly to the drawings, the invention is illustrated as being applied to a gate valve of the non-rising stem type having a body 10 provided with a passage therethrough controlled by reciprocating movements of the gate member 12. Threadedly engaging with the gate member 12 is a valve stem 14 which projects through the bonnet 16 of the valve body 10 and is provided with the usual collar 18 which is engaged by a nut (not shown) secured to the bonnet 16 and by means of which the stem 14 is prevented from partaking of the reciprocating movements of the gate 12. The bonnet 16 carries a yoke member 22 terminating in an annular cap 24 through which the stem 14 projects. The stem 14 has a conical end 20 for the reception of the usual handwheel which is dispensed with in applying the operating mechanism of this invention to such valves. The yoke 22 is slotted to receive a pointer 21 threaded on the stem 14 and cooperating with suitable indicia 23 marked on the yoke to indicate the open and closed positions of the valve.

The cap 24 has a recess 26 around the stem opening providing a socket for the reception of a head 28 formed on the end of a hollow driving member 30. The driving member 30 has oppositely disposed keyways 32 formed on its interior surface for slidable engagement with keys 34 projecting from the periphery of an adapter 36 which engages the tapered end of the valve stem 14 and is secured in position by means of the nut 38 engaging with the usual threaded projection 40 on the conical end of the valve stem 14. The end of the driving member 30 opposite the head 28 provides a bearing portion for a handwheel clutch element 42 which is journaled thereon and supports handwheel 44 which is secured against rotation relative thereto by means of a key 46. A closure cap 48 threadedly engages the adjacent end of the driving member 30 and overlies the hub of the handwheel 44 to prevent withdrawal from the clutch element 42.

The handwheel clutch element 42 is provided with an enlarged cup-shaped portion 50 upon the base of which the hub of the handwheel 44 is partly supported. Projecting inwardly from the rim of the cup-shaped portion 50 is a series of clutch teeth 52 which engage with cooperating teeth 54 formed on an upper annular flange 56 of a slidable clutch member 58 which also has a lower annular flange 60 without teeth and connected to the upper annular flange 56 by a body portion 62. The clutch member 58 is of annular form and is mounted on the driving element 30 with the body 62 and flange 60 projecting from the handwheel clutch element 42. The upper flange 56 and body portion 62 of the member 58 are provided with an annular recess 64 for reception of a coil spring 66 which extends from the lower flange 60 into engagement with a similar annular recess 67 of lesser depth in the inside face of the cup shaped portion 50 of the handwheel clutch element 42. The driving element 30 is provided with a key 68 which projects into a suitable keyway formed on the inner surface of the slidable clutch member 58 and permits reciprocating movement of the clutch relative to the driving element while preventing relative rotation.

The annular cap 24 of the valve yoke serves to support the larger end of a substantially elliptical gear housing 70 secured thereto by means of the screws 72. The gear housing 70 is cup-shaped and is provided with an interior collar 74 defining a circular opening with its wall spaced from the driving element 30. The collar terminates adjacent the toothed rim of clutch member 42 and is provided with an internal annular flange 76 intermediate its ends through which the driving member 30 projects. The flange 76 serves to support the clutch member 58 in its lowermost position and its underside is provided with a series of cylindrical chambers 78 within which plungers 80 are adapted to reciprocate in fluid tight engagement. Any suitable number of chambers and plungers may be provided and, in this instance, eight are shown. The plungers 80 each have a head portion 82 of less thickness than the depth of the chamber 78 and are provided with a stem portion 84 which projects through a suitable perforation 86 formed in the flange 76 concentric with the chambers 78.

A closure plate 88 is mounted on the head portion 28 of the driving element 30 within the collar 74 for closing the opening therethrough and is secured to the gear housing 70 by means of the screws 90. The closure plate 88 is spaced from the flange 76 providing an annular chamber for the reception of a nozzle ring 92, the underside of which is provided with a pair of annular grooves 94 and 96 positioned concentrically one within the other. The gear housing 70 has a pair of diametrically opposite passages 98 and 99 which register with passages 100 and 101 respectively formed in the closure plate 88. The passage 100 communicates with the annular groove 94 while the recess 101 communicates with the annular groove 96. Fluid entering the passage 98 travels through passage 100 and to groove 94 from where it is distributed to four of the chambers 78 beneath the plungers 80 by apertures 95 connecting the groove with the chambers. In the same way, fluid entering the opposite passage 99 travels through passages 101 to groove 96 and enters four other chambers 78 through apertures 97 connecting this groove with these chambers. The apertures 95 and 97 connect with alternate chambers so that plungers equally distributed around the clutch are actuated simultaneously.

The end of the interior collar 74 of the gear housing 70 is spaced from the toothed portion 52 of the handwheel clutch 42 and projecting therebetween is an annular flange 102 formed on a spur gear 104. The spur gear is journaled on the collar 74 and is maintained against longitudinal movement by the flange 102 projecting between the parts described. The flange 102 is provided with an arcuate projection 106 forming a hammer element with which a similar arcuate projection 108 forming an anvil element on portion 62 of the clutch element 58 engages.

The smaller end of the elliptical gear housing 70 provides support for a pinion 110 driven from the spindle 112 of an air motor 114 of any suitable construction which depends from and is secured to the gear housing by means of the screws 116. The pinion 110 may engage directly with the spur gear 102 but, in this instance, an idler gear 118 is interposed therebetween and mounted on a stud 120 projecting from the gear housing 70. A cover 122 encloses the gearing and clutch elements and has an opening which extends around the cup-shaped portion 50 of the handwheel clutch 42 on the underside of the handwheel 44.

The fluid connections for the motor 114 and the clutch elements consist, in this embodiment, of suitable piping which serves to connect these parts to a distributing valve designated generally by the reference numeral 124. The connection at the motor 114 may comprise a piping connection 126 which extends from the motor to a pipe T 128 carried by the gear housing 70 and communicating with the passage 98 and from the T 128 by means of a pipe 130 to one side of the distributing valve 124. The opposite side of the distributing valve is connected by the pipe 132 to a pipe T 134 carried by the gear housing 70 and communicating with the passage 99 and from the T 134 by means of a pipe 136 to the motor 114.

The distributing valve 124 of this invention consists of a pair of cylindrical plates 138 and 140 secured together by means of the screws 142. The plate 138 is bored for the reception of a plug 144 projecting therefrom and carrying an operating handle 146. The plug projects into a central recess 148 in the plate 138 with which a passage 150 communicates. A fluid supply pipe 151 connects with the passage 150 and supplies pressure fluid from a source of supply. The plug 144 has a blind axial opening 152 which is non-circular and receives a similar non-circular projection 154 of a distributing valve member 156. The distributing valve 156 is housed within a recess 158 formed in the plate 140 in registry with recess 148 and with which a pair of spaced passages 160 and 161 communicate. The passages 160 and 161 communicate with the supply pipes 130 and 132 respectively.

The distributing valve member 156 is provided with a C-shaped recess forming a port 164 and a pair of spaced ports 166 and 168 which are adapted to register with the ports 160 and 161 respectively when the valve is rotated in its seat. The C-shaped port is formed in the face of the valve member 156 adjacent the bottom of recess 158 and serves to connect the ports 160 and 161 with an axial passage 162 in the plate 140. The valve member 156 may be resiliently held to its seat in the recess 158 of plate 140 by means of a coil spring 170 housed within the blind opening 152 between the projection 154 and the bottom of the blind opening. Suitable indicia for three positions of the distributing valve may be provided, and in this embodiment take the form of letters O, N and S designating open, neutral and shut marked on the plate 138. The handle 146 is provided with a pointer 172 which cooperates with projections 174 formed on the plate 138 adjacent the indicia. A pair of limit stops 176 may project from the plate 138 to engage with the pointer 172 and limit rotation of the valve member 156.

Figure 1:
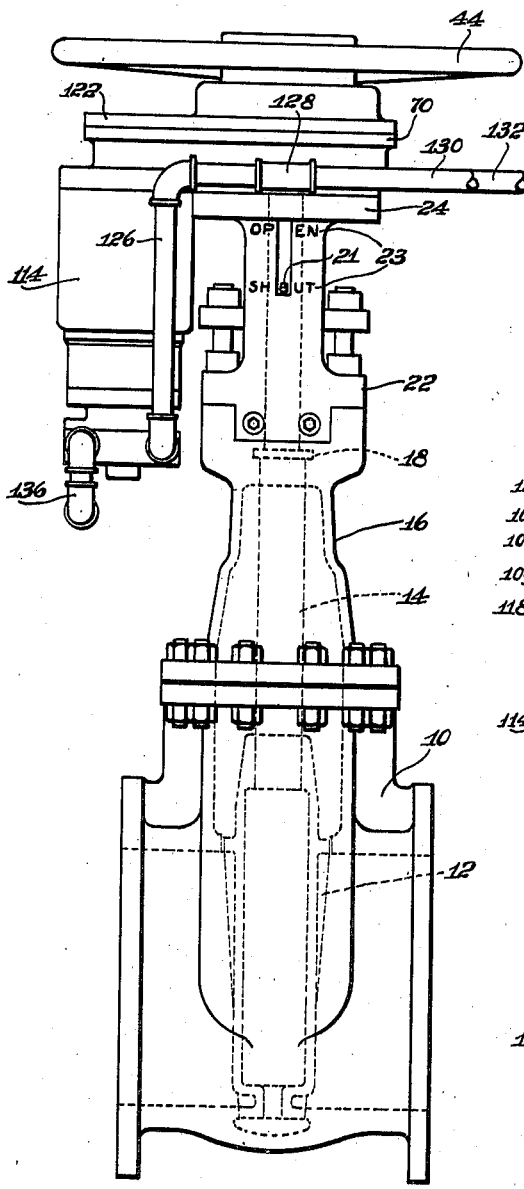
Fig. 1 is a front elevation of a gate valve having the invention applied thereto.
Figure 6:
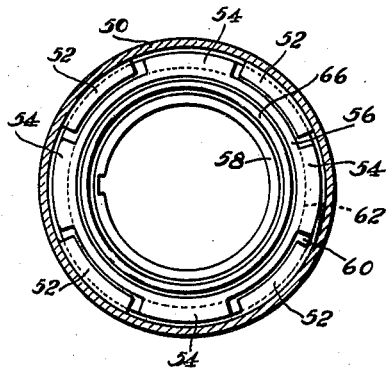
Fig. 6 is a section taken on the line VI—VI of Fig. 3.

In the operation of the device described it may be assumed that the gate valve member 12 is in the closed position shown in Fig. 1. The distributing valve member 124 is then in neutral position and the C-shaped port 164 thereof is in the position shown in Fig. 11. In this position both ports 160 and 161 communicating with the pipes 130 and 132 respectively are also in communication with the exhaust 162 due to the position of the C-shaped port 164 as shown diagrammatically in Fig. 13. The ports 166 and 168 are closed by the unported area of plate 140 and there is no outlet for pressure fluid entering the distributing valve. If it is desired to open the gate valve 12 by manual operation, the handwheel 44 may be rotated to rotate the stem 14 through the interposition of the clutching means described. Thus upon such rotation, the handwheel clutch element 42 will be rotated through the key 46 and will rotate the slidable clutch member 58 through the teeth 52 and 54 on these parts. When the clutch 58 is rotated, the driving element 30 will in turn be rotated through the key 68 and, through the keys 34, will cause rotation of the valve stem 14 through the adapter 36 secured thereto.

If, on the other hand, it is desired to open the valve by power operation, the distributing valve handle 146 is moved in an arcuate path to align the indicator 172 with the lug 174 adjacent the O marking. The port 168 in the distributing valve member 156 will be moved into overlying relationship with the port 161 while the port 160 remains connected through the C-shaped port with the exhaust 162. This position is shown diagrammatically in Fig. 15. Air is now supplied by way of the pipe 132 to the T fitting 134 to the outer annular groove 96 of the clutch assembly. From this groove 96 the air enters those piston chambers 78 which are connected with the groove 96 by way of the apertures 97. At this time it will be apparent that the inner groove 94 and the apertures 95 connected therewith are in communication with the exhaust 162 through the T fitting 128 and pipe 130. The pistons 80 associated with the apertures 97 and receiving air from the groove 96 will be actuated to the position shown in Fig. 7. In this position the slidable clutch 58 is actuated upwardly compressing the spring 66 and moving the teeth 54 thereon out of engagement with the teeth 52 of the handwheel clutch 50. The anvil element 108 carried by the clutch 58 is thus moved into the plane of the hammer element 106 carried by the spur gear 104.

Simultaneously with admission of air to actuate the pistons 80 air is also admitted by way of the pipe 136 to the air motor 114. The motor is adapted upon receiving air from the pipe 136 to rotate in a counterclockwise direction thus rotating the pinion 110 and spur gear 104 through the idler 118 in a similar direction. The hammer 106 thereupon engages the anvil 108 with an impact sufficient to free the valve 12 from its seat. The drive in this case of motor operation is through the clutch 58 by way of the key 68 to driving element 30 which causes rotation on the stem 16 through the adapter 36 and associated key 34. It will be observed that the handwheel 44 is completely disconnected from the driving element 30 at this time by the reciprocation of the clutch 58 to disengage the teeth 52 and does not rotate. It will furthermore be apparent that during manual operation of the valve the motor is disconnected by connection of both supply ports 160 and 161 with the exhaust 162 permitting spring 66 to reengage the handwheel clutch. In the event that motor operation is initiated then the handwheel 44 is immediately disconnected by the slidable movement of the clutch 58 described. In cases where the distributing valve 124 is located at a remote point from the valve structure to be operated, there is no danger that, during manual operation by one operator, another will commence motor operation to spin the handwheel and cause injury if the manual means were not automatically disconnected.

In order to close the valve manually it is apparent that the handwheel 44 need only be rotated in a clockwise direction as is customary to conduct this operation. In the case of motor operation, the distributing valve handle 146 is moved to the S position serving to connect the port 166 with port 160 and the C-shaped port 164 with the other port 161. As illustrated in Fig. 14 the air from the supply pipe 151 is then conducted through the ports described to the pipe 130 and enters the power actuation mechanism through the T 128 simultaneously with its admission to the motor through the pipe 126. As the T fitting 128 is connected through passage 98 with the inner annular groove 94, the pistons 80 which receive fluid through the ports 95 associated with the groove 94 are thereupon actuated. The groove 96 is at this time connected through the passage 99 and T fitting 134 with the pipe 132 and to exhaust. The motor 114 receiving fluid through the pipe 126 is thereupon rotated in a clockwise direction and initiates similar rotation of the valve stem 16 through the gearing and clutching elements previously described. When the valve 12 has reached its seat the valve handle 146 may be moved to the neutral position whereupon both ports 160 and 161 are connected by the C-shaped port 164 with the exhaust and ports 166 and 168 closed as previously described.

It will be observed that there is sufficient clearance between the valve stem nut 38 and the closure cap 48 to permit travel of the valve stem 14 relatively to the driving element 30. Such provision enables the operating unit to be used on rising stem valves, such as the globe and angle types, if desired and without structural alteration.

If the operating unit is to be used on rising stem valves where the stem travel is considerable, as on rising stem gate valves, the modified form shown in Fig. 9 may be used. The stem in such valves does not rotate, but threadedly engages in a yoke nut and reciprocates therein. In place of such yoke nut, the driving element 180 is provided with a threaded bore engaging the valve stem 182. The closure cap 184 threaded to the driving element is provided with an opening 186 bored to clear the valve stem but otherwise is the same as in the previous embodiment. The driving element 180 may also be keyed to the slidable clutch 58 which, together with the other parts shown, is identical with that previously described and carries similar reference numeral.

The combined manual and power actuating unit of this invention may take other forms than that described and illustrated herein and it is to be understood that the embodiments disclosed are not to be taken as limiting the scope of the invention as set forth in the appended claims.

I claim:

1. A valve operating mechanism comprising in combination, a handwheel to operate the valve between positions, a fluid motor to operate the valve between said positions, means movable to establish valve operating relation with either said handwheel or motor, separate conduits for supplying fluid to said motor for operating the valve selectively in different directions from one position to another, and means for connecting said motor supply conduits to apply fluid pressure to said movable means.

2. A valve operating mechanism comprising in combination, a handwheel to operate the valve between positions, a fluid motor to operate the valve between said positions, means movable to establish valve operating relation with either said handwheel or motor, separate conduits for supplying fluid to said motor for operating the valve in different directions from one position to another, means controlling the supply of fluid to said conduits according to the direction of valve operation, and means for connecting said motor supply conduits to apply fluid pressure to said movable means under control of said controlling means.

3. A valve operating mechanism comprising in combination, a handwheel to operate the valve between positions, a fluid motor to operate the valve between said positions, means movable to establish valve operating relation with either said handwheel or motor, separate conduits for supplying fluid to said motor for operating the valve in different directions from one position to another, a distributing valve controlling the supply of fluid to said conduits according to the direction of valve operation, a plurality of pressure operated elements for actuating said movable means to establish motor operation of said valve, and means for applying fluid pressure to at least one of said elements independently of another under control of said distributing valve.

4. A valve operating mechanism comprising in combination, a handwheel to operate the valve between positions, a fluid motor to operate the valve between said positions, means movable to disconnect the handwheel from valve operating relation and connect the motor in such relation, separate conduits for supplying fluid to said motor for operating the valve in different directions from one position to another, said conduits acting alternately to conduct exhaust fluid from said motor, a distributing valve for reversing the direction of flow in said conduits according to the direction of valve operation, a plurality of pressure operated elements for actuating said movable means to establish motor operation of said valve, and connections from each of said conduits to different ones of said elements whereby fluid pressure is applied to at least one of said elements while another said element is connected with the exhaust.

5. A combined manual and power actuating unit for rising and non-rising stem valves, comprising a hollow driving element mounted on the valve stem and adapted for relative longitudinal movement, a handwheel journaled on the driving element, clutch means for connecting said handwheel and driving element together, power actuated means engageable by said clutch means for connection to said driving element, means operable on said clutch for selective engagement thereof with said handwheel and power actuated means, and means for connecting the last said means to a source of power.

6. A combined manual and power actuating unit for rising and non-rising stem valves, comprising a hollow driving element mounted on the valve stem and adapted for relative longitudinal movement, a handwheel journaled on the driving element, clutch means slidably but non-rotatably mounted on said driving element, interengaging means on said handwheel and clutch for connecting said handwheel to said driving element, power actuated means engageable by said clutch for connection to said driving element, means biasing said clutch into engagement with said handwheel, and power actuated means for overcoming said biasing means and engaging the first said power actuated means and clutch.

7. A combined manual and power actuating unit for valves, comprising a driving element for the valve stem, a handwheel rotatable with respect to said driving element, clutch means slidably mounted on the driving element, interengaging means on the handwheel and clutch for transmitting rotation of the handwheel to said driving element, power actuated means engageable by said clutch for connection to said driving element, means connecting said power actuated means to a source of power, said means serving alternately as supply to and exhaust from said power actuated means, and means for actuating said clutch by power from said connecting means.

8. Power operated changeover means for selective manual and power actuation of a driven element, comprising a driving element operably connected to the driven element, manually operable means rotatable relatively to said driving element, a motor and gearing therefor normally disconnected from said driving element, and a clutch normally biased to connect said manually operable means to said driving element for manual operation of the driven element but being automatically disengageable therefrom to connect said gearing and driving element upon operation of said motor, said clutch including a reciprocable member secured against relative rotation with the driving element and having impact imparting engagement with said gearing upon operation of said motor, and power actuated means for engaging said member and gearing.

9. Power operated changeover means for selective manual and power actuation of a driven element, comprising a driving element operably connected to the driven element, manually operable means rotatable relatively to said driving element, a motor and gearing therefor normally disconnected from said driving element, and a clutch normally biased to connect said manually operable means to said driving element for manual operation of the driven element but being automatically disengageable therefrom to connect said gearing and driving element upon operation of said motor, said clutch including an annular member slidably but non-rotatably mounted on said driving element, a plurality of plungers spaced around one side of said annular member, an annular chamber connecting said plungers, and means connecting said chamber with the power supply to said motor for engaging said annular member and gearing.

10. A valve operating mechanism comprising in combination, a driving element operably connected to the valve stem, a handwheel rotatable relatively to said driving element, a fluid motor and gearing therefor normally disconnected from said driving element, means movable between said gearing and handwheel to establish connection with one or the other and said driving element, separate conduits for supplying fluid to said motor for operating the valve in different directions from one position to another, a distributing valve for reversing the direction of flow in said conduits, biasing means normally maintaining said movable member in position to establish connection between said handwheel and driving element, a plurality of plungers spaced around the side of said member opposite said biasing means, and separate chambers connecting alternate plungers and being connected individually with separate conduits for applying fluid pressure to said plungers to operate said movable means against the action of said biasing means.

11. Spindle operating means comprising in combination, manually operable means for operating the spindle, a fluid motor for operating the spindle, means movable to establish spindle operating relation with either said manual means or motor, separate conduits for supplying fluid to said motor for operating said spindle selectively in different directions, and means for selectively connecting said motor supply conduits to supply fluid pressure to said movable means.

12. A combined manual and power actuating means comprising a driving element, manually operable means rotatable with respect to said element, a clutch slidably mounted on said element, interengaging means on said manual means and clutch for transmitting rotation of said manual means to said element, power actuated means engageable by said clutch for connection to said element, means connecting said power actuated means to a source of power, said means serving alternately as supply to and exhaust from said power actuated means, and means for actuating said clutch by power from said connecting means.

13. A combined manual and power actuating means for spindles, comprising a manually operable device for operating said spindle, a power operated device for operating said spindle, each said device having a driving connection spaced from the other, driving means mounted on said spindle for reciprocable movement between said connections for establishing operative engagement between one device and the spindle while simultaneously disengaging the other, means biasing said driving means into operative engagement with said manually operable device, means for controlling the power supply to said power operated device, and common means connecting said controlling means to said power operated device for power operation thereof and to said driving means for overcoming said biasing means.

14. A combined manual and power actuating means for spindles, comprising a manually operated device for operating said spindle, a power operated device for operating said spindle, a clutch to establish spindle operating relation with either said manual or power operated device, separate means for supplying power to said power operated device to operate said spindle selectively in different directions, and means connected to said power supply means for supplying power to operate said clutch.

15. A combined manual and power actuating means for spindles, comprising a manually operated device for operating the spindle, a power operated device for operating the spindle, a clutch to establish spindle operating relation with either said manual or power operated device, a pair of connections for supplying power to said power operated device for operating said spindle selectively in different directions, branch connections from each of said pair for supplying power to operate said clutch, and distributing means with which said pair are connected positioned remote from said operated devices.

ARTHUR J. TROTT.